United States Patent [19]

Mustapha et al.

[11] Patent Number: 5,377,797
[45] Date of Patent: Jan. 3, 1995

[54] CLUTCH ENGAGEMENT CONTROL METHOD IN RESPONSE TO TRANSMISSION SHIFT LEVER POSITION

[75] Inventors: Adam M. Mustapha, Dearborn; Donald J. Rozsi, Marshall, both of Mich.

[73] Assignee: Eaton Corporation, Cleveland, Ohio

[21] Appl. No.: 99,499

[22] Filed: Jul. 30, 1993

[51] Int. Cl.$^6$ .................................................. B60K 41/22
[52] U.S. Cl. ................... 192/3.55; 192/3.62; 192/3.63
[58] Field of Search ...................... 192/3.55, 3.62, 3.63

[56] References Cited
U.S. PATENT DOCUMENTS 4,344,514 8/1982 Fujihara et al. .............. 192/3.62 X
4,723,642 2/1988 Grunberg et al. .................. 192/3.55

Primary Examiner—Richard M. Lorence
Attorney, Agent, or Firm—Loren H. Uthoff, Jr.

[57] ABSTRACT

A method to control a driveline clutch system disposed between an engine and a manual or semi-automatic transmission where position sensors indicate the location of a gearshift lever in a gear selection gate to provide information to a clutch controller connected to a clutch actuator. The clutch is engaged when the gearshift lever is moved past the 80 percent position to a 100 percent position in a gear selection gate and the clutch is disengaged when the gearshift lever is moved from the 100 percent position to the 20 percent position in a gear selection gate.

3 Claims, 3 Drawing Sheets

FIG 3
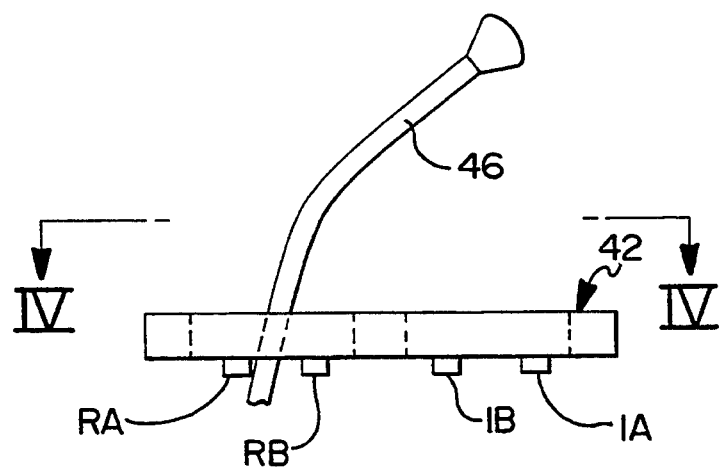
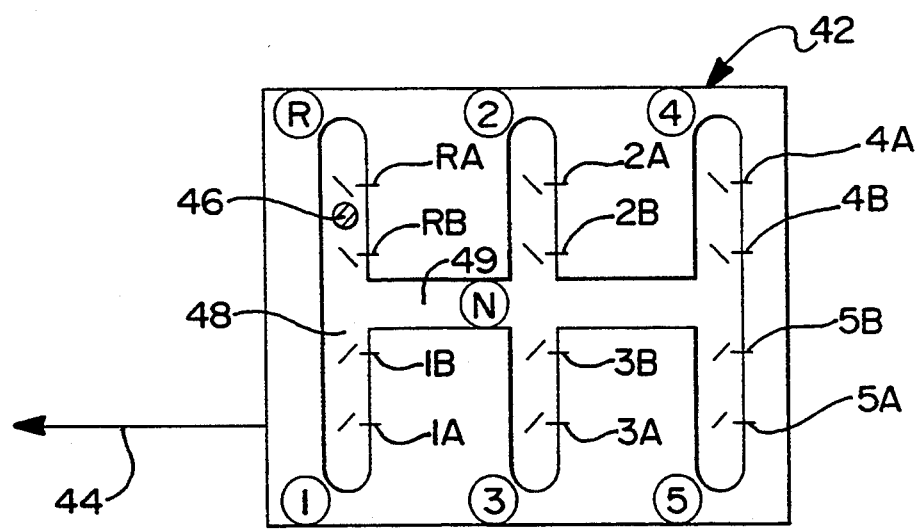
FIG 4

CLUTCH ENGAGEMENT CONTROL METHOD IN RESPONSE TO TRANSMISSION SHIFT LEVER POSITION

FIELD OF THE INVENTION

This invention relates to semi-automatic and mechanical transmission systems for a vehicle. More particularly, the present invention relates to semi-automated and mechanical transmission systems of the type which are provided with an automated driveline clutch controlled by a clutch control unit for causing clutch manipulation to complete a shift sequence in response to a defined, measured movement of a gearshift mechanism.

DESCRIPTION OF THE PRIOR ART

In a vehicle having an automotive power train using a manually shiftable transmission and a foot-operated clutch unit interposed between the transmission and the output shaft of the automobile engine, gearshifts are effected by manipulating a gearshift lever mounted on the steering column or the floorboard. In general, before the gearshift lever is to be moved to make a gearshift in the transmission, the driver of the automobile is required to depress a clutch pedal to uncouple the clutch unit which has been transmitting the engine drive to the power input shaft of the transmission. Usually, the gearshift lever is thus manipulated by the driver when the clutch unit is in uncoupled position interrupting the transmission of the engine drive to the power input shaft of the transmission. The clutch unit, so uncoupled, is coupled after the gearshift has been completed to allow the engine power to be transmitted to the input shaft of the transmission.

With the automotive powertrain of the type described above, the manipulation of the gearshift lever and operation of the clutch requires the driver to have advanced skills and is time consuming and laborious. In view of this, as an improved version of a gearshift system effective to overcome these drawbacks and requiring less effort using a semi-automatic or a manual transmission utilizes an automated driveline clutch unit thereby eliminating the need for a foot operated clutch pedal. An electronically controlled clutch actuator is used to engage or disengage the clutch in response to a signal from a clutch control unit. There is known, an automotive powertrain using a manually shiftable transmission and an automatically operated clutch unit such as disclosed in, for example, U.S. Pat. Nos. 2,732,447, 3,910,388, 4,144,424 and 4,158,404, the disclosures of which are hereby incorporated by reference.

Fully automatic and semi-automatic transmission systems, both for heavy-duty vehicles such as heavy-duty trucks, and for automobiles, that sense throttle openings or positions, vehicle speeds, engine speeds and the like, and automatically shift the vehicle transmission in accordance therewith, are well known in the prior art. Fully automatic change gear transmission systems include automated transmissions wherein pressurized fluid is utilized to fictionally engage one or more members to other members or to a ground to achieve a selected gear ratio as well as automated mechanical transmissions utilizing electronic and/or pneumatic logic and actuators to engage and disengage mechanical (i.e. positive) transmission clutches to achieve a desired gear ratio. Such transmissions can also be manually shifted using a modified gearshift lever to signal the control system to change gear ratios where the control system also signals the clutch actuator to engage or disengage the clutch. Examples of such transmissions may be seen by reference to U.S. Pat. Nos. 3,961,546; 4,081,065 and 4,361,060, the disclosures of which are hereby incorporated by reference. Such transmissions, when manual selection of a desired gear ratio is made using a gearshift lever, are defined to be included under the classification of "semi-automatic" transmission as used herein.

Semi-automatic transmission systems utilizing electronic control units which sense throttle position, engine, input shaft, output shaft and/or vehicle speed, and utilize automatically controlled fuel throttle devices, gear shifting devices and/or driveline clutch operating devices to substantially fully automatically implement operator manually selected transmission ratio changes are known in the prior art. Examples of such semi-automatic transmission systems may be seen by reference to U.S. Pat. Nos. 4,425,620; 4,631,679 and 4,648,290, the disclosures of which are incorporated herein by reference.

Generally, a manually operated gearshift mechanism can be used to select a desired transmission gear ratio when using a semi-automatic or a more traditional manual transmission. When semi-automatic or manual transmissions are shifted manually, the operator selects a transmission gear ratio with movement of a gearshift lever. The semi-automatic transmission includes a clutch control system as part of the overall transmission control system which uses the outputs of a variety of sensors to determine when to signal the driveline clutch to disengage and then re-engage the clutch to accomplish the shift to the desired transmission ratio. Position sensors are located on the gearshift mechanism to determine the gear ratio desired by the driver. A limitation of this system is that vibration of the gearshift mechanism can give a false indication of a requested shift change when none is in fact desired resulting in false disengagements of the clutch. Also, timing of the clutch activation is especially critical on such transmissions having an automated clutch system to accomplish a smooth transmission shift. Ideally, a different clutch operation strategy is required depending on whether the transmission is being moved in or being moved out of a gear select position to properly disengage and engage the clutch to prevent undesired activation due to gearshift lever vibration or inadvertent small movement by the operator resulting in damage.

SUMMARY OF THE INVENTION

According to the present invention, there is provided an electronic position sensing apparatus adapted to a gearshift assembly for use in association with a vehicle powertrain having an automated clutch using a manually shiftable semi-automatic or manual transmission unit which uses a gearshift lever movable in a plurality of gear-shifting directions being shiftable to any one of a plurality of different gear positions. The automated clutch unit is disposed between the transmission unit and an engine and is capable of exclusively assuming coupled and uncoupled positions where the clutch unit, when in the coupled position, establishes a power transmission link between the engine and the transmission unit and, when in the uncoupled position, such power transmission is interrupted.

The electronic position sensing apparatus includes a plurality of electronic switches or position sensing means, hereinafter referred to as the gearshift electronics which signals when the gearshift lever is partially positioned or fully positioned into a gearshift selection gate so as to select a transmission gear ratio or to shift from an engaged ratio into a neutral position.

The purpose of the gearshift electronics is to signal the clutch control unit and possibly an electronic control unit (ECU) that controls the transmission operation when the gearshift lever is moved so as to pass through gearshift gate positions corresponding to predetermined percentages of the total stroke required for the gearshift lever to move from the neutral position to full engagement of any one of the different gear ratios. For example, when the gearshift lever is moved from the fully engaged position a distance corresponding to 80% of the total stroke towards the neutral position.

When a new transmission gear ratio is selected, the clutch control system recognizes from the signals from the gearshift electronics when the gearshift lever has been moved past the 20% position into the 80% position in the gearshift gate. Upon reaching the 80% position, the clutch is signaled to engage since this predetermined movement of the gearshift lever indicates that a new ratio has been selected by the operator. Such movement is not commonly caused by gearshift vibration or inadvertent movement of the gearshift lever.

A clutch actuator is used to engage and disengage the clutch which can be an electromagnetic device such as a motor driven gearset which is electrically connected to a source of electric power and operable to bring the clutch unit into the uncoupled and coupled positions when the electromagnetic control is energized and de-energized, respectively. A clutch control system is used for selectively opening and completing a circuit between the electromagnetic device and the electric power source for controlling the operation of the automatic clutch system.

In accordance with the present invention, the drawbacks of the prior art automated clutch control systems are overcome by the provision of an automated clutch system of the present invention wherein, after manual initiation of a selected shift by movement of the gearshift lever by the operator so as to select a new gear ratio, the clutch control system uses gearshift lever position information to achieve the necessary driveline connection or disconnection upon a defined movement of the transmission gearshift mechanism either into or out of a ratio. By this arrangement, undesirable and/or unnecessary uncoupling of the clutch unit which would occur under the influence of vibrations of the gearshift assembly or inadvertent small movements by the operator after the gearshift has been made can advantageously be avoided. The control system can be used to determine when an actual gearshift is wanted and then suitably controlling the automatic clutch based on the information derived from the gearshift electronics and further, the control system can determine when a gear change is not wanted based on the current and past position history of the movement of the gearshift lever.

The above is accomplished by providing a semi-automated transmission system or a traditional manual transmission with an actuator for controlling the operation of a driveline clutch which is activated only after a predetermined degree of movement of the transmission gearshift lever to select a higher or lower transmission gear ratio as determined based on the output signal of the gearshift electronics. The actuator is controlled by command output signals from the clutch control system and may include transmission controls and/or electronic engine controls and known data links such as described in the SAE J1922 protocol or the like.

Accordingly, it is one provision of the present invention to provide an improved clutch control system for a vehicle having an automated clutch based on shift lever position information.

Another provision of the present invention is to provide an improved clutch control system for a vehicle having an automated clutch and a gearshift mechanism where the clutch is engaged when the gearshift lever is moved from approximately 20% to 80% of its travel in a gear selection gate.

Another provision of the present invention is to provide an improved clutch control system for a vehicle having an automated clutch and a gearshift mechanism where the clutch is disengaged when the gearshift lever is moved from approximately 80% to 20% of its travel in a gear selection gate.

Still another provision of the present invention is to provide a clutch control system for a vehicle having an automated clutch and a gearshift mechanism where a position sensing means is adapted to the gearshift mechanism and connected to the clutch control system.

This and other objects and advantages of the present invention will become apparent from a reading of the detailed description of the preferred embodiment taken in connection with the attached drawings.

BRIEF DESCRIPTION OF THE DRAWINGS

FIG. 3 is a side view of the shift lever assembly for the clutch control system of the present invention having a plurality of position switches mounted thereto;

FIG. 4 is a top view of the shift pattern of the shift lever assembly of FIG. 3 with gearshift lever position switches.

DETAILED DESCRIPTION OF THE PREFERRED EMBODIMENT

Figure 2:
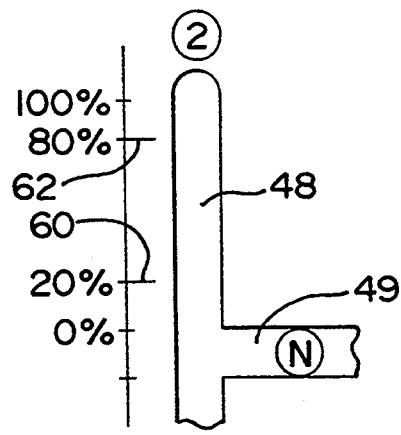
FIG. 2 is a top view of one shift gate of the gearshift lever assembly as shown in FIG. 1.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the gearshift mechanism as conventionally mounted in a vehicle, being respectfully from left and right sides of the gearshift mechanism as illustrated in FIG. 2. The words "inwardly" and "outwardly" will refer to directions toward and away from, respectively, the geometric center of the device and designated parts thereof. Said terminology will include the words above specifically mentioned, derivatives thereof and words of similar import.

The term "semi-automatic transmission" is used to designate a change speed or change gear transmission having a multiple forward speed main transmission section which can be operated in a fully automatic or semi-automatic mode where there is no operational input required for the automatic mode of the driver or the driver must select each gear for the semi-automatic mode. "Automated clutch assembly" and words of similar import shall designate a clutch assembly utilized to nonrotatably couple a selected gear to a shaft by means of a positive clutch in which engagement of said clutch is controlled by some form of actuation device to control the degree of engagement or disengagement of the driveline clutch mechanism in response to a clutch control system.

Figure 1:
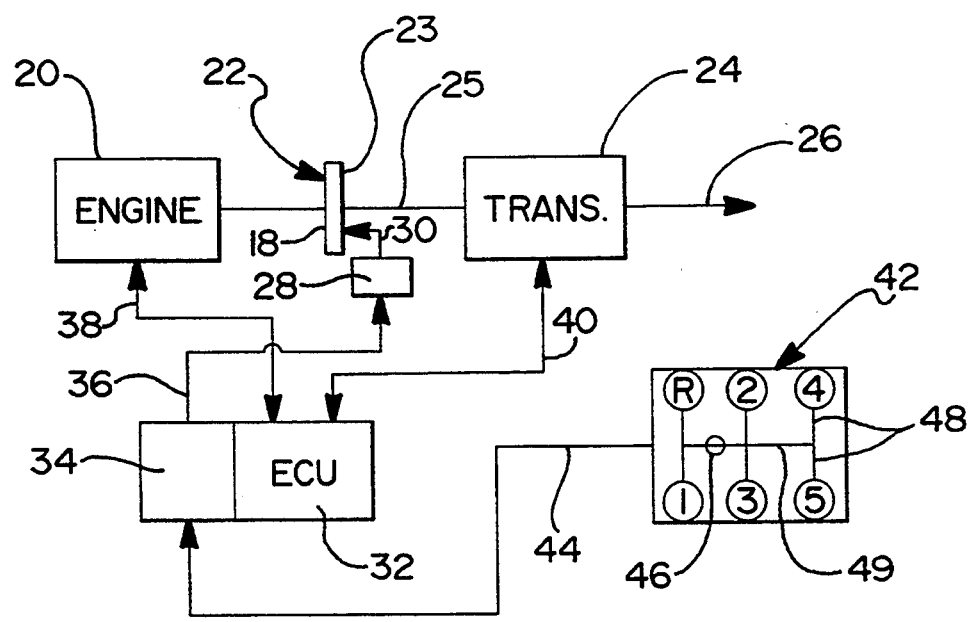
FIG. 1 is a schematic illustration of a vehicular mechanical transmission system and the automated clutch system of the present invention.

Referring to FIG. 1, a transmission 24 of the type partially automated by the driveline automated clutch control system of the present invention is illustrated. The transmission 24 is a multiple speed main transmission section which is mechanically connected in series to an engine 20 through an automated clutch 22 on the input shaft 25 and to the balance of the vehicle driveline via the output shaft 26. Transmission 24 includes an input shaft 25 driven by a prime mover such as diesel engine 20 through a selectively disengaged, normally engaged friction master automated clutch 22 having an input or driving portion 18 drivingly connected to the engine crankshaft (not shown) and a driven portion 23 rotatably fixed to the transmission input shaft 25. Transmissions similar to mechanical transmission 24 are well known in the prior art and may be appreciated by reference to U.S. Pat. Nos. 3,105,395; 3,283,613 and 4,754,665, the disclosures of which are incorporated by reference.

The automated clutch control system for a mechanical transmission system of the present invention is schematically illustrated in FIG. 1. Electronic control unit (ECU) 32, preferably microprocessor based, includes the clutch control unit 34, in addition to the control circuitry for input and output of signals from the transmission 24 described above. The clutch control unit 34 receives position signals from the gearshift assembly 42 and sends clutch control signals to the clutch actuator 28. The ECU 32 may also receive inputs from other various vehicle sensors and may also control various vehicle devices and processes.

The clutch control unit 34 is effective to process the inputs from the gearshift assembly 42 in accordance with predetermined logic rules and to issue command output signals on line 36 to a clutch operator, such as actuator 28 which controls the engagement or disengagement of the automated clutch 22 through a mechanical clutch linkage 30.

A plurality of position sensors (not shown) are mounted on the gearshift assembly 42 for sensing when the gearshift lever 46 has reached a specific position and that information is then sent to the clutch control unit 34. The purpose of the gearshift lever 46 is to allow the driver operator to select any one of a plurality of transmission drive ratios by moving the gearshift lever 46 from the neutral shift gate 49 into any one of the shift gates 48. The position sensors can be on/off switches or potentiometers or any other type of position sensing transducers which provide an electrical output dependent on position of the gearshift lever 46 on line 44 which is connected to the automated clutch control unit 34. The gearshift assembly 42, as used herein, includes the gearshift mechanism consisting of the gearshift lever 46 which is used to select a transmission gear ratio by moving the gearshift lever 46 into a plurality of shift gates 48 and the position sensors.

The clutch control unit 34 operates on the position sensor signal on line 44 to control the engagement and disengagement of the driveline automated clutch 22 through control of a clutch actuator 28. Specifically, the clutch control unit 34 determines if the gearshift lever 46 is being moved in or out of a specific shift gate 48 to select a specific gear ratio. Shift gate 49 is the neutral position where no transmission drive ratio is selected. If the gearshift lever 46 is being moved into a gear ratio, the automated clutch 22 is not allowed to be engaged until the gearshift lever 46 has passed through a predetermined gear position and almost fully into an in-gear position range. If the gearshift lever 46 is being moved out of a selected gear ratio, the automated clutch 22 is not allowed to be disengaged until the gearshift lever 46 has moved out of the in-gear position range and past the predetermined gear position range.

Using this strategy, vibration or slight inadvertent movement of the gearshift lever 46 by the driver will not cause driveline automated clutch 22 to be engaged or disengaged when unwanted. The gearshift lever 46 is moved within a gear selection shift gate 48 to select a gear ratio in the transmission 24. To actually move a gear selection mechanism (not shown) attached to the transmission 24 depends on the type of transmission used. If a traditional mechanical transmission is used, the gearshift assembly 42 is mechanically linked to a shift mechanism internal to the transmission 24. If a semi-automatic or fully automatic transmission is used, a plurality of pneumatic, hydraulic or electronic actuators controlled by the ECU 32 are used to move a shift mechanism within the transmission 24. The present invention can be used with any of these types of transmissions.

Referring to FIG. 2, as an alternative to position sensors mounted to the gearshift assembly 42 such as potentiometers, two switches can be used within each gear selection gate 48, a first switch 60 positioned at approximately 20% of the shift gate travel and a second switch 62 is positioned at approximately 80% of the available shift gate 48 travel for each in-gear position of the gearshift lever 46 to signal the clutch control unit 34. FIG. 2 shows in schematic form how these two switches (60,62) are positioned to be activated as the gearshift lever 46 is moved in the shift gate 48. For each gear select position along the shift gate 48, two switches (60,62) are used. The first switch 60 is mounted within the shift gate position of 20% of the total available travel of the gearshift lever 46 in the shift gate 48, and the second switch 62 is positioned at within the same shift gate 48 at a position of 80% of the total available travel. The "out-of-gear" position is at the interface between the aforementioned 20% gear position range and the neutral position range. The full in-gear position is at the 100% the in-gear position range. Each switch is electrically connected to the clutch control unit 34 by connection line 44.

Thus, to engage a transmission gear ratio, the gearshift lever must be moved to at least 80% of the shift gate travel to engage the automated clutch 22 while to get out of a transmission gear, the lever must be moved from 100% to 20% of the gate travel whereupon the clutch control unit 34 signals the actuator 28 to disengage the automated clutch 22. The shift control system of the present invention thereby prevents the automated clutch 22 from being prematurely engaged or disengaged due to vibration of gearshift lever 46 or inadvertent small movement by the driver. All of the shift gate travel percentages (i.e. 100%, 80% and 20%) are approximate and can be modified to produce the same functional result depending on the specific gearshift and driveline characteristics.

FIG. 3 is a side view of a gearshift assembly 42 showing a plurality of switches RA, RB, 1A and 1B positioned along the reverse and first gear shift gates respectively. Switches RA and 1A detent when the gearshift lever 46 passes the 80% travel point and switches RB and 1B detent when the gearshift lever 46 passes the 20% travel point.

FIG. 4 illustrates the use of electrical switches to detect the position of the gearshift lever 46. Switches RB, 1B, 2B, 3B, 4B and 5B are positioned to be activated by the gearshift lever 46 when moved to 20% of the gate travel of their gear select positions R, 1, 2, 3, 4, 5 respectively. Switches RA, 1A, 2A, 3A, 4A and 5A are positioned to be activated by the gearshift lever 46 when moved to 80% of the gate travel of the gear select positions R, 1, 2, 3, 4, 5 respectively. All of the switches are connected to the ECU 32 and specifically to the clutch control unit 34.

The clutch control unit 34 looks to see if an "A" switch or a "B" switch is closed first (where the "A" switch is any one of switches RA, 1A, 2A, 3A, 4A or 5A and a "B" switch is any one of switches RB, 1B, 2B, 3B, 4B or 5B). If a B switch is closed prior in time to an A switch (referring to RA or 1A-5A), then the gearshift lever 46 is being moved into gear and the automated clutch 22 is disengaged and will not be allowed to re-engage until the A switch closes. If an A switch is first to close, then the gearshift lever 46 is being moved out of gear to neutral. The automated clutch 22 is engaged and will not be allowed to disengage until the gearshift lever 46 is moved out of gear a sufficient distance to close the corresponding B switch (referring to RB or 1B-5B). In this manner, the automated clutch 22 is controlled by the clutch control unit 34 to reduce false disengagements due to vibration or inadvertent small movement of the gearshift lever 46.

Figure 5:
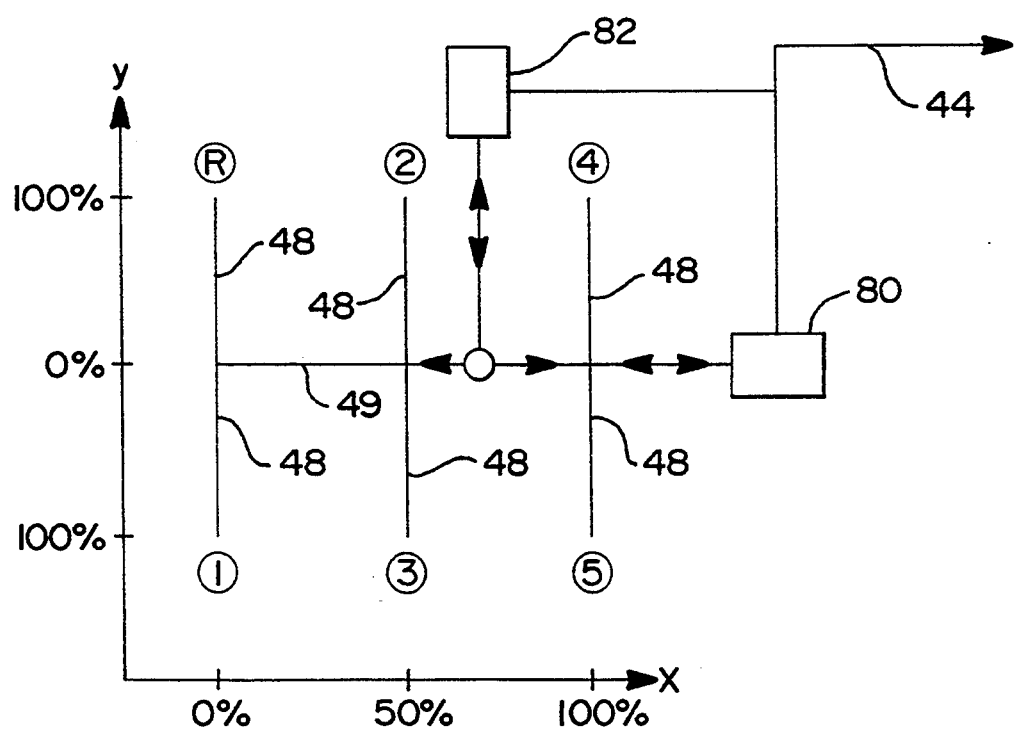
FIG. 5 is a schematic illustration of the shift pattern of the transmission gear change mechanism of FIG. 2 with gearshift lever X-Y position sensors.

FIG. 5 illustrates a gearshift assembly 42 using a plurality of displacement measuring devices to determine the location of the gearshift lever 46. An X coordinate sensor 80 and a Y coordinate sensor 82, both of which can be string potentiometers or other sensors that convert displacement of the gearshift lever 46 into an electrical signal are connected to the gearshift lever 46 and is a suitable manner to measure separately the X and Y positions of the gearshift lever 46. In this manner, both the X and Y positions of the gearshift lever 46 can be transmitted via line 44 to the clutch control unit 34 and the position of the gearshift lever 46 can be determined by the clutch control unit 34 and a clutch control strategy similar to that discussed with reference to FIG. 4 can be implemented, i.e. if the gearshift lever 46 is moving out-of-gear, then the automated clutch 22 is not allowed to disengage until the gearshift lever 46 has been moved out of the shift gate 48 to approximately the 20% of the gate travel as shown adjacent to shift gate 2 48 position 60 in FIG. 2. If the gearshift lever 46 is moving out of the neutral gate 49 into a gear, then the automated clutch 22 is not allowed to engage until the gearshift lever 46 is moved into shift gate 48, (for example ratio gate 2), and reaches the 80% gate travel (position 62 in FIG. 2).

The advantage to the use of X-Y position sensors 80 and 82 are that a continuous position for the gearshift lever 46 can be measured and used to further enhance the clutch control system 34 with adjustments for speed and position history of gearshift lever 46 movement.

The importance of allowing the vehicle operator to manually select the initiation of a shift from a currently engaged ratio to a manually or automatically preselected target ratio may be seen by review of U.S. Pat. No. 5,089,962, the disclosure of which is incorporated herein by reference.

Accordingly, it may be seen that a relatively simple and inexpensive automatic clutch engagement/disengagement is shown in one embodiment using a clutch control unit 34 for a mechanical transmission 24 requiring only gearshift lever position sensors (80,82) and a clutch control system 34 to be added to a vehicle which includes an electronically controlled clutch actuator 30 which operates to engage or disengage an automated clutch 22 according to a command signal from the clutch control unit 34. Clutch control unit 42 receives the two X-Y position signals on line 44 from the position sensors (80,82) and for issuing command out signals to the clutch actuator. The system automatically controls operation of the clutch 22 when the transmission 24 is either manually or automatically shifting requiring the operator to only initiate the process by selecting a new transmission gear ratio using the gearshift lever 46.

Although the present invention has been described with a certain degree of particularity, it is understood that various changes to form and detail may be made without departing from the spirit and the scope of the invention as hereinafter claimed.

We claim:

1. A method of clutch control for a vehicle driveline including an engine and transmission based on position and direction of travel of a transmission gearshift lever comprising:

providing a driveline clutch drivingly interposed between the engine and the transmission where the engagement or disengagement of said driveline clutch is selected by an electronically controlled clutch actuator;

providing a gearshift lever movable in a plurality of directions into a plurality of gear selection gates to indicate an operator's choice of a transmission ratio;

providing a position sensing means responsive to at least two positions of said gearshift lever and generating a signal during selection of a gear ratio;

providing a clutch control system connected to said position sensing means and said clutch actuator, said clutch control system including means responsive to said position sensing means for issuing command output signals to said clutch actuator;

engaging said driveline clutch when said position sensing means indicates that said gearshift lever has moved past a gear selection gate position of approximately 80 percent into a gear selection gate position of approximately 100 percent;

disengaging said driveline clutch when said position sensing means indicates that said gearshift lever has moved from said gear selection gate position of approximately 100 percent to a gear selection gate position of approximately 20 percent.

2. The method of clutch control of claim 1, wherein said position sensing means is comprised of a plurality of potentiometers adapted to measure the position of said gearshift lever to indicate movement in a first direction and a second direction where said first direction is in the same plane and perpendicular to said second direction.

3. The method of clutch control of claim 1, wherein said position sensing means is comprised of a plurality of electrical switches where for each gear selection gate, at least two of said switches are adapted such that a first switch is activated when said gearshift lever is at a gear selection gate position of approximately 20 percent and a second switch is activated when said gearshift lever is at a gear selection gate position of approximately 80 percent.

* * * * *